Patented Nov. 12, 1940

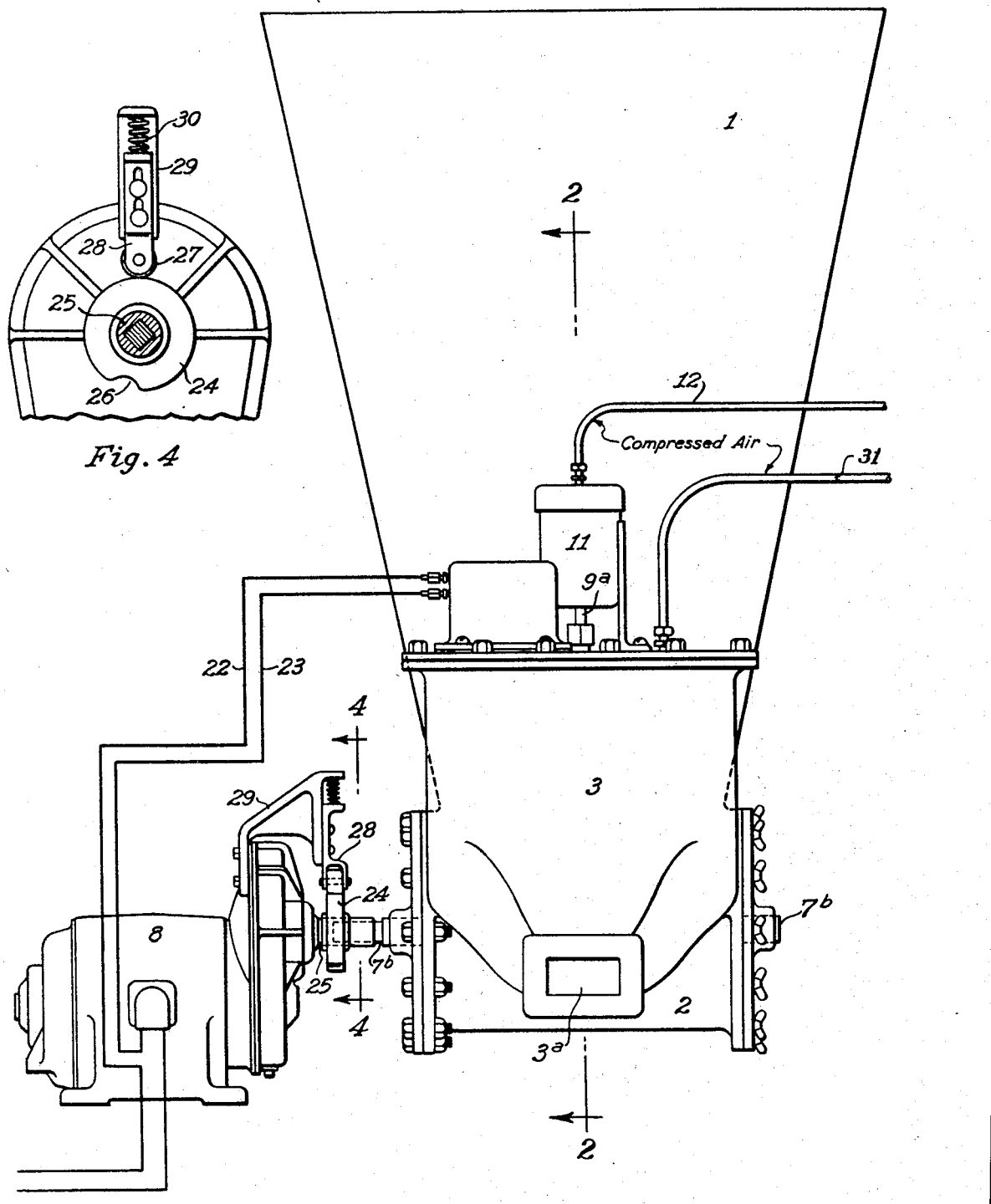

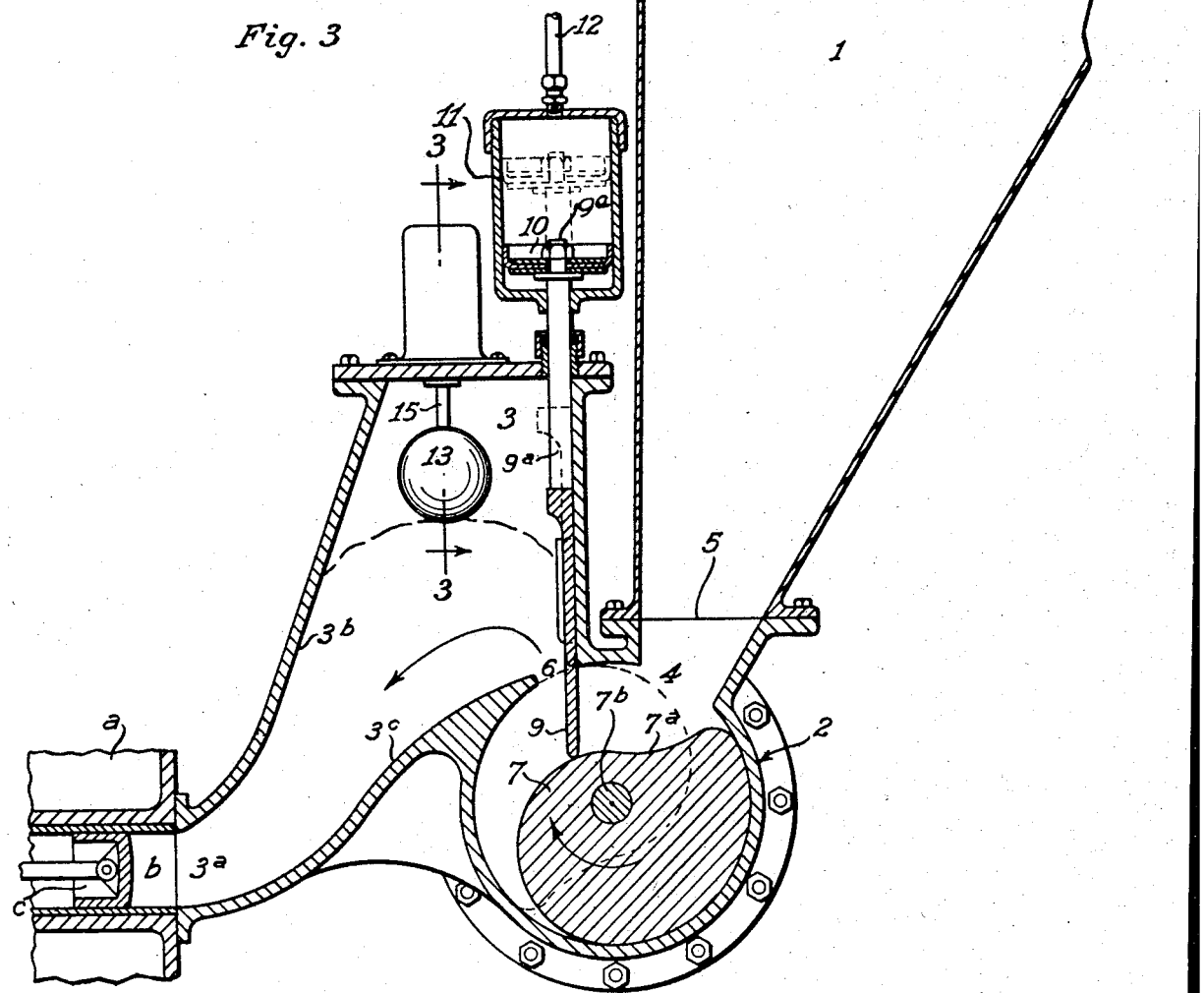

2,221,327

UNITED STATES PATENT OFFICE 2,221,327

PNEUMATIC DOUGH FEEDER

Herbert C. Rhodes, Portland, Oreg.

Application May 2, 1939, Serial No. 271,269

6 Claims. (Cl. 107—15)

My invention is designed to serve as a complementary dough feeding means for a dough-dividing machine of the type described by my United States Patent 2,178,406, dated October 31, 1939.

In order to make the purpose of my invention clear, I will briefly describe the machine described by my said patent. It comprises a rotated annular table having pockets in its rim portion, into which pockets dough is fed from a hopper. A plunger is reciprocated in each pocket so as to admit dough into the pocket and later expel the same again. In the practical operation of my said machine, I have found it necessary that the dough be fed into the said dough-receiving pockets under an elastic pressure, in order to assure that the dough will follow closely the retraction of the plunger in its pocket and thus fill said pocket successively with definite quantities of dough, which is essential to proper operation of my dough-dividing machine.

But I further observed that dough must not be subject to air under pressure greater than atmospheric for too long a period of time. The reason for this is, according to my belief, dough has a tendency to "age," that is, there is an excessive breaking down of the cellulose structure of the dough which results in what is known as a "gassy" dough, thus making it difficult to mold the dough into the desired form as, for example, rolls or other pieces of dough.

According to my observation and conclusion, the period during which dough is exposed to air under pressure greater than atmospheric should not exceed approximately two minutes. Therefore, one of the main objects of my invention is to provide a means whereby dough will be transferred from a receiving hopper to a pneumatic pressure chamber, from which the dough will be fed to the dough-receiving pockets of the table of my said machine; and thereby the retention of the dough in the pneumatic pressure chamber will be limited to a predetermined period of time.

Furthermore, in order to assure the periodic emptying of the pneumatic pressure chamber within successive maximum periods of time and thus limit the time during which the dough contained in the pressure chamber would be exposed to air under pressure therein, I control and limit the amounts of dough periodically transferred to the pressure chamber from the hopper. This I conveniently accomplish by a float which rides on the dough contained in the pressure chamber and by which the operation of the means provided by me for effecting a transfer of the dough from the receiving hopper to the pneumatic pressure chamber is controlled. In that way the transfer of dough from the receiving hopper to the pneumatic pressure chamber, from which the pockets of the table of my dough dividing machine are filled, is continued until a predetermined quantity of dough has been transferred to the pressure chamber, whereupon further operation of said transfer means is stopped until the pressure chamber has been substantially emptied again; thus causing a drop in the level of the dough contained in the pressure chamber, and therewith said float, thus again setting the dough transferring devices into operation.

I accomplish the transfer of unit portions of dough from the dough hopper to said pressure chamber by a cam-shaped transfer rotor, rotated at slow speed so that it is easily stopped; and I arrange said control so that when the transfer rotor is stopped its position will be such that its greatest diameter will be substantially vertical with its dough-receiving cam face under said hopper; thus causing the filling of the receiving side of the housing of said transfer rotor with dough from the hopper. This, moreover, should be the position of the transfer rotor when my device is to start to operate.

The said control of the rotation of the transfer rotor is further so arranged as to stop the rotor when the quantity of dough contained in the pressure chamber has reached such volume as will require approximately the full predetermined limited period of time within which the pressure chamber must be emptied, so as not to hold the dough too long under the pressure maintained in the pressure chamber; and said control is further so arranged as to start the transfer rotor again as soon as the dough contained in the pressure chamber falls to a level two inches approximately above the inlet from such passageway into said dough-receiving chamber. This I believe necessary in order that the dough held in the discharge side of the said passageway, while the transfer rotor is in action, will, in conjunction with the dough contained in the pressure chamber, provide a seal preventing the air in the pressure chamber from passing through said passageway to its receiving side.

Further details of the construction and operation of my invention are hereinafter fully described with reference to the accompanying drawings.

In the drawings:

Fig. 1 is a front elevation showing a general view of my pneumatic dough feeder;

Fig. 2 is a vertical sectional elevation taken on line 2—2 of Fig. 1 but drawn on a larger scale; the dough transferring rotor 7 is shown in full lines as moving towards the completion of one dough transferring operation, and is shown in dotted outline in the position it assumes when it has completed the transfer and is again positioned to receive a further charge of dough;

Fig. 3 is a fragmentary section corresponding to line 3—3 of Fig. 2 and illustrating certain details of construction; and Fig. 4 is a fragmentary section on the line 4—4 of Fig. 1.

My invention comprises a hopper 1 in which the dough is initially placed, which hopper is mounted on one side of a housing of annular cross-section 2. On the opposite side of the housing 2 is mounted a gas-tight chamber 3 hereinafter termed pressure chamber, which is connected by pipe 31 to any suitable source of compressed air. The interior of the housing 2 constitutes a passageway 4 connecting the discharge end or outlet 5 of the hopper 1 with said pressure chamber 3; the latter having an inlet port 6 preferably located in the upper part of the housing 2. Within the housing or passageway 2 is rotatably mounted a cam-shaped transfer rotor 7 having a dough receiving face 7a. The rotor 7 is mounted on a shaft 7b which is rotated clockwise through the medium of a motor 8, the shaft 7b being connected therewith by suitable speed regulating gearing. On the peripheral face of the transfer rotor 7 is slidingly but yieldingly seated a gate 9. Preferably, this gate is firmly but yieldingly held on the peripheral face of the rotor 7 by a piston 10 having a stem 9a which bears on the gate 9, said piston reciprocating in a cylinder 11 connected by a pipe 12 with a suitable source of air under compression. The gate 9 functions as a constant sealing partition separating the dough-receiving and dough-discharging sides of the passageway 4, it being understood that the lower extremity of the gate 9 bears on the periphery of the rotor 7 and is such as to provide and maintain a substantially airtight condition enabling the gate 9 to perform its designed function.

The operation of the device so far described is as follows: The cam-faced transfer rotor 7 is driven clockwise at such speed as to fill the pressure chamber 3 with a given quantity of dough from the hopper 1 within a predetermined limited period of time. This period of time is determined relatively to the time required for the quantity of dough contained in the pressure chamber to be discharged through the outlet 3a of the pressure chamber within such period of time, within which the dough in the pressure chamber 3 may be subjected to air under pressure substantially greater than atmospheric without being deteriorated or affected in its quality. As mentioned in the introduction of this specification, my invention is intended to function as a complementary device for feeding dough to a dough-dividing machine of the type described by my said previous patent. A section of the annular rotated table of my said dough-dividing machine is designated by a. The dough-receiving pocket provided in the rim portion of said table is designated b and the piston reciprocating in said pocket is designated c. In practice my pneumatic dough feeder constituting my present invention is cooperatively arranged as illustrated by Fig. 2. Thus the neck or discharge outlet 3a of the pressure chamber 3 is arranged to discharge into the pocket b of the rotatable table of my dough-dividing machine.

In order to limit the quantity of dough which will be transferred from the hopper 1 by the transfer rotor 7 to the pressure chamber 3 to such quantity as may be expelled from the pressure chamber by the air pressure therein maintained within the predetermined limited period of time, which, as above mentioned, I believe should not exceed approximately two minutes, I provide a control for the device effecting the rotation of the transfer rotor 7. Such control I found convenient to construct in the form of a float 13 having a stem pivotally mounted as at 14 within the pressure chamber 3. On the stem 13a rests a vertically reciprocable rod 15 which bears against a rockable plate 16 carrying a conventional mercury switch 17. The rockable plate 16 is mounted in a bracket 18 which has a laterally extending arm 19 on which is mounted a coil spring 20 normally tending to tilt the rockable plate 16 counterclockwise. A stop 21 limits the reverse or clockwise rotation of the rockable plate 16. The mercury switch has conductors 22 and 23 leading to one of the electric power supplying leads of the motor 8. The float 13 rides on the dough contained in the pressure chamber 3, and when the level of dough in the pressure chamber reaches a predetermined height, the rotation of the transfer rotor 7 is stopped; and when the said level falls below a predetermined point said transfer rotor is started again. As previously mentioned, the quantity of dough transferred from the hopper 1 to the pressure chamber 3 must be limited to such quantity as will be discharged from the pressure chamber within a given interval of time, which, as stated, should be limited to two minutes, and the lowest level to which the dough contained in the pressure chamber 3 is permitted to drop should be approximately two inches above the inlet 6 from the passageway 4 to the pressure chamber 3. The fixing of the lowest level of the dough contained in the pressure chamber is for the purpose of assuring that the dough held in the discharge side of the passageway 4 while the transfer rotor 7 is in action will, in conjunction with the dough contained in the pressure chamber 3, make a seal preventing the air in the pressure chamber from passing through said passageway to its dough-receiving side. My experience has convinced me that the lowest level to which the dough in the pressure chamber 3 should be permitted to fall is approximately two inches above the inlet 6. The maximum height to which the dough in the pressure chamber is permitted to rise must likewise be fixed so the dough contained in the pressure chamber will be emptied therefrom in the interval during which the transfer rotor 7 is stopped, so that the pressure chamber 3 will be continuously emptied and filled again with fresh dough from the hopper 1. To facilitate the emptying of the pressure chamber, the lower portions of the walls of the pressure chamber should taper downward to its discharge outlet 3a, as will be observed from comparing Figs. 1 and 2. To further facilitate and assure the proper emptying of the pressure chamber, I found that the wall 3b of this chamber opposite its inlet 6 should slope downward and the floor 3c of this chamber should slope downward from its inlet port 6 to its discharge outlet 3a, approximately as shown by Fig. 2.

In order to assure the proper function of the transfer rotor 7, it is rotated at slow speed so that it may be easily stopped, and I arrange the control of its rotation in such manner so that when the transfer rotor is stopped its position will be such that its greatest diameter will be substantially vertical and its dough-receiving cam face will be under the discharge end of the hopper 1. The position which the transfer rotor 7 will assume in its cycles of operation for receiving dough from the hopper 1 is indicated by dotted outline in Figure 2. By this arrangement the filling of the receiving side of the passageway 4 with dough from the hopper will be assured and therefore the transfer rotor 7 should be positioned as mentioned when my pneumatic dough feeder is started.

The stopping of the motor and thus the stopping of rotation of the transfer rotor 7 in the position described are accomplished by the following means. A disk 24 is keyed on the shaft 25 of a speed reducing unit 8 and said disk has a notch 26 in its periphery as shown by Fig. 4. A roller 27 is carried by a yoke 28 which is slidably mounted in a bracket 29 and the yoke 28 is constantly held in contact with the periphery of the disk 24 by a compression spring 30. Consequently, the roller 27 drops into the recess or notch 26 of the disk 24 in each revolution of the latter, and when the power to the motor operating the transfer rotor 7 is cut off by the position of the mercury switch 17, the usual subsequent coasting or idling of the motor is quickly reduced so that the roller 27 may drop in the notch 26 of the disk 24 and arrest further rotation of the transfer rotor 7.

The specific details above described of the construction of my pneumatic dough feeder are to be understood as merely such as I found convenient for carrying my invention into practice, but the same may be varied as deemed expedient so long as the principle of operation of my invention is maintained.

I claim:

1. A pneumatic dough feeder comprising, a hopper, a chamber chargeable with pneumatic pressure for receiving and expelling dough under said pressure, means for transferring dough from said hopper to said chamber, such means comprising a passageway of annular cross-section between said hopper and said chamber, a motor actuated cam-shaped transfer rotor in said passageway and a gate sliding and yieldably held on said transfer rotor and in cooperation therewith separating the inlet and outlet sides of said passageway, the shape of the cam-face of said transfer rotor being arranged relatively to the cross-sectional interior area of said passageway, so as to transfer a definite unit of dough from said hopper to said chamber with each rotation of the transfer rotor, and means including a float in said pressure chamber for controlling said motor rotor, and thereby the quantity of dough transferred to said chamber.

2. A pneumatic dough feeder comprising, a hopper, a chamber chargeable with pneumatic pressure for receiving and expelling dough under said pressure, means for transferring dough from said hopper to said chamber, such means comprising a passageway of annular cross-section between said hopper and said chamber, a motor actuated cam-shaped transfer rotor in said passageway and a gate sliding and yieldably held on said transfer rotor and in cooperation therewith separating the inlet and outlet sides of said passageway, the shape of the cam-face of said transfer rotor being arranged relatively to the cross-sectional interior area of said passageway, so as to transfer a definite unit of dough from said hopper to said chamber with each rotation of the transfer rotor, and means including a float in said pressure chamber for controlling said motor rotor, and thereby the quantity of dough transferred to said chamber, said motor-controlling means further including stop mechanism whereby to arrest the transfer rotor when stopped in its dough-receiving position.

3. In a pneumatic dough feeder, a hopper, a chamber chargeable with pneumatic pressure for receiving and expelling dough under said pressure, means for transferring dough from said hopper to said chamber, such means comprising a passageway of annular cross-section between said hopper and said chamber, a motor actuated cam-shaped transfer rotor in said passageway and a gate sliding and yieldably held on said transfer rotor and in cooperation therewith separating the inlet and outlet sides of said passageway, the shape of the cam-face of said transfer rotor being arranged relatively to the cross-sectional interior area of said passageway, so as to transfer a definite unit of dough from said hopper to said chamber with each rotation of the transfer rotor said cam face being devoid of sharp edges.

4. In a pneumatic dough feeder, a hopper, a chamber chargeable with pneumatic pressure for receiving and expelling dough under said pressure, means for transferring dough from said hopper to said chamber, such means comprising a passageway of annular cross-section between said hopper and said chamber, a motor actuated cam-shaped transfer rotor in said passageway and a gate sliding and yieldably held on said transfer rotor and in cooperation therewith separating the inlet and outlet sides of said passageway, and means including a float in said pressure chamber for controlling said motor rotor, and thereby the quantity of dough transferred to said chamber.

5. In a pneumatic dough feeder, a hopper, a chamber chargeable with pneumatic pressure for receiving and expelling dough under said pressure, means for transferring dough from said hopper to said chamber, such means comprising a passageway of annular cross-section between said hopper and said chamber, a motor-actuated cam-shaped transfer-rotor in said passageway, a gate riding on said transfer-rotor and in cooperation therewith separating the inlet and outlet sides of said passageway, and means applying a resilient force to said gate constantly holding the same on said transfer-rotor.

6. In a pneumatic dough feeder, a hopper, a chamber chargeable with pneumatic pressure for receiving and expelling dough under said pressure, means for transferring dough from said hopper to said chamber, such means comprising a passageway of annular cross-section between said hopper and said chamber, a motor-actuated cam-shaped transfer-rotor in said passageway, a sliding gate riding on said transfer-rotor and in cooperation therewith separating the inlet and outlet sides of said passageway, and means applying a resilient force to said gate constantly holding the same on said transfer rotor.

HERBERT C. RHODES.